United States Patent
Xu et al.

(10) Patent No.: US 10,642,429 B2
(45) Date of Patent: May 5, 2020

(54) TOUCH COMPONENT FOR AVOIDING GHOSTING, MANUFACTURING METHOD THEREOF AND TOUCH SCREEN INCLUDING THE SAME

(71) Applicants: BOE TECHNOLOGY GROUP CO., LTD., Beijing (CN); Hefei Xinsheng Optoelectronics Technology Co., Ltd., Hefei, Anhui (CN)

(72) Inventors: Jiawei Xu, Beijing (CN); Qicheng Chen, Beijing (CN); Jun Li, Beijing (CN); Lei Zhang, Beijing (CN); Tsung Chieh Kuo, Beijing (CN)

(73) Assignees: BOE TECHNOLOGY GROUP CO., LTD., Beijing (CN); Hefei Xinsheng Optoelectronics Technology Co., Ltd., Hefei, Anhui (CN)

( * ) Notice: Subject to any disclaimer, the term of this patent is extended or adjusted under 35 U.S.C. 154(b) by 0 days.

(21) Appl. No.: 16/058,895

(22) Filed: Aug. 8, 2018

(65) Prior Publication Data
US 2019/0146605 A1 May 16, 2019

(30) Foreign Application Priority Data
Nov. 14, 2017 (CN) .......................... 2017 1 1122749

(51) Int. Cl.
*G06F 3/042* (2006.01)
*G06F 3/044* (2006.01)

(52) U.S. Cl.
CPC ............ *G06F 3/044* (2013.01); *G06F 3/0445* (2019.05); *G06F 3/0446* (2019.05); *G06F 2203/04103* (2013.01); *G06F 2203/04112* (2013.01)

(58) Field of Classification Search
CPC ........... G06F 3/044; G06F 2203/04103; G06F 2203/04112
USPC ....................................................... 345/174
See application file for complete search history.

(56) References Cited

U.S. PATENT DOCUMENTS

| | | | | |
|---|---|---|---|---|
| 2015/0060120 A1* | 3/2015 | Park | ........................ | G06F 3/044 174/257 |
| 2015/0242013 A1* | 8/2015 | Ono | ........................ | G06F 3/044 345/174 |
| 2015/0342034 A1* | 11/2015 | Iwami | .................. | H05K 1/0274 345/174 |
| 2016/0370916 A1* | 12/2016 | Hashimoto | ............. | G06F 3/044 |

* cited by examiner

*Primary Examiner* — Jonathan M Blancha
(74) *Attorney, Agent, or Firm* — Foley & Lardner (57) ABSTRACT

The present disclosure provides a touch component, a method for manufacturing the touch component and a touch screen. The touch component includes a first metal mesh layer and a second metal mesh layer which are opposite to each other, the first metal mesh layer including a plurality of first touch channel areas, the first virtual wiring area including a plurality of first virtual wiring openings, the second metal mesh layer including a plurality of second touch channel areas and a plurality of second virtual wiring areas, the second virtual wiring area including a plurality of second virtual wiring openings. A projection of at least part of the first virtual wiring opening on the second metal mesh layer intersects with a grid line of the second metal mesh layer.

16 Claims, 6 Drawing Sheets

TOUCH COMPONENT FOR AVOIDING GHOSTING, MANUFACTURING METHOD THEREOF AND TOUCH SCREEN INCLUDING THE SAME

CROSS REFERENCE

The present application claims the priority of Chinese Patent application No. 201711122749.3, filed on Nov. 14, 2017, and the entire contents thereof are incorporated herein by reference as part of the present application.

TECHNICAL FIELD

The present disclosure relates to the field for touch screen technology, and in particular, to a touch component, a method for manufacturing the touch component and a touch screen.

BACKGROUND

Conventional touch screens are generally applied to devices with a small size screen, such as smart phones and tablet computers. For such touch screen, Indium Tin Oxide (ITO) is mainly used as a touch conductive film layer which forms desired touch patterns through photolithography. However, due to the large sheet resistance and high cost for ITO materials, it is not suitable for large size touch screens. In recent years, the touch screen is applied to devices such as all-in-one machines and large-size notebook computers, and metal meshes are used as touch patterns at present. The metal mesh has a lower sheet resistance, and this can effectively reduce the Resistance Capacity Delay (RC Delay) and prevent electrostatic discharge (ESD).

SUMMARY

According to some arrangements of the present disclosure, there is provided a touch component including a first metal mesh layer and a second metal mesh layer. The first metal mesh layer includes a plurality of first touch channel areas extending in parallel in a first direction and a plurality of first virtual wiring areas between adjacent ones of the first touch channel areas, and the first virtual wiring area includes a plurality of first virtual wiring openings for separating adjacent first touch channel areas. The second metal mesh layer is opposite to the first metal mesh layer and includes a plurality of second touch channel areas extending in parallel in a second direction and a plurality of second virtual wiring areas between adjacent ones of the second touch channel areas. The first direction intersects the second direction, and the second virtual wiring area includes a plurality of second virtual wiring openings for separating the adjacent second touch channel areas. In this case, a projection of at least part of the first virtual wiring opening on the second metal mesh layer intersects with a grid line of the second metal mesh layer, and a projection of at least part of the second virtual wiring opening on the first metal mesh layer intersects with a grid line of the first metal mesh layer.

In an exemplary arrangement of the present disclosure, the first virtual wiring area includes a plurality of first virtual wirings, and the first virtual wiring opening is formed between the plurality of the first virtual wirings and the plurality of the first touch channel area and between the first virtual wirings.

In an exemplary arrangement of the present disclosure, the second virtual wiring area includes a plurality of second virtual wirings, and the second virtual wiring opening is formed between the plurality of the second virtual wirings and the plurality of the second touch channel area and between the second virtual wirings.

In an exemplary arrangement of the present disclosure, a projection of at least part of the first virtual wiring opening on the second metal mesh layer is located on a grid of the second metal mesh layer, and a projection of at least part of the second virtual wiring opening on the first metal mesh layer is located on a grid of the first metal mesh layer.

In an exemplary arrangement of the present disclosure, the metal grid of the first metal mesh layer is a diamond metal grid, the metal grid of the second metal mesh layer is a diamond metal grid; and the metal grid of the first metal mesh layer and the metal grid of the second metal mesh layer have the same size.

In an exemplary arrangement of the present disclosure, the first virtual wiring has an X-shaped structure. The second virtual wiring has an X-shaped structure.

In an exemplary arrangement of the present disclosure, the intersection of the X-shaped structure of the first virtual wiring is aligned with the centroid of the grid of the second metal grid layer. The intersection of the X-shaped structure of the second virtual wiring is aligned with the centroid of the grid of the first metal grid layer.

In an exemplary arrangement of the present disclosure, the metal grid is formed of one or more of copper, aluminum and silver.

According to some arrangements of the present disclosure, there is provided a method for manufacturing a touch component.

The method includes forming a first metal mesh layer on a substrate, the first metal mesh layer includes a plurality of first touch channel areas extending in parallel in a first direction and a plurality of first virtual wiring areas between adjacent ones of the first touch channel areas, and the first virtual wiring area includes a plurality of first virtual wiring openings for separating adjacent first touch channel areas, forming a first insulating layer on the first metal mesh layer.

The method further includes forming a second metal mesh layer on the first insulating layer, the second metal mesh layer is opposite to the first metal mesh layer and includes a plurality of second touch channel areas extending in parallel in a second direction and a plurality of second virtual wiring areas between adjacent ones of the second touch channel areas, the first direction intersects the second direction, and the second virtual wiring area includes a plurality of second virtual wiring openings for separating the adjacent second touch channel areas.

A projection of at least part of the first virtual wiring opening on the second metal mesh layer intersects with a grid line of the second metal mesh layer.

A projection of at least part of the second virtual wiring opening on the first metal mesh layer intersects with a grid line of the first metal mesh layer.

The method further includes forming a second insulating layer on the second metal mesh layer.

According to some arrangements of the present disclosure, there is provided a touch screen including any one of the above-mentioned touch components.

It should be appreciated that both the foregoing general description and the following detailed description are exemplary and explanatory only and are not restrictive of the present disclosure.

BRIEF DESCRIPTION OF THE DRAWINGS

The accompanying drawings herein, which are incorporated in and constitute a part of this specification, illustrate arrangements consistent with the present disclosure, and together with the specification serve to explain the principles of the present disclosure. Obviously, the drawings in the following description are merely some arrangements of the present disclosure, and those skilled in the art can also obtain other drawings based on these drawings without any creative work.

DETAILED DESCRIPTION

Exemplary arrangements will now be described more comprehensively with reference to the accompanying drawings. However, exemplary arrangements can be implemented in various forms and should not be construed as being limited to the examples set forth herein; rather, these arrangements are provided so that the present disclosure will be described more comprehensively and entirely, and will fully convey the concept of the exemplary arrangements to those skilled in the art. The same reference numerals in the drawings denote the same or similar structures, and the repeated description thereof will be omitted.

Although relative terms such as "upper" and "lower" are used in this specification to describe the relative relationship between one component and another component, these terms are used in this specification for convenience only, and, for example may be used according to the direction in the drawings. It will be understood that if the illustrated device is turned upside down, the "upper" component described above will become the "lower" component. Other relative terms such as "high", "low", "top", "bottom", "left" and "right" also have similar meanings. When a structure is "on" another structure, it may mean that the structure is integrally formed on the another structure, or that the structure is "directly" disposed on the another structures, or that the structure is "indirectly" disposed on the another structure through still another structure.

The terms "a", "an" and "the" are used to indicate the presence of one or more elements/components; the terms "comprising" and "having" are used to represent the open-ended meanings and refer to that, in addition to the listed elements/components, there may be additional elements/components.

Figure 1:
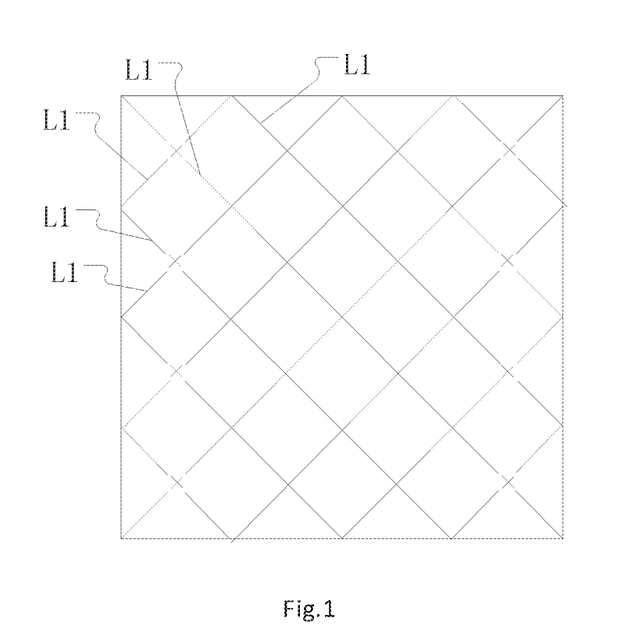
FIG. 1 is a schematic diagram illustrating a structure of a first metal mesh layer in related art.
Figure 2:
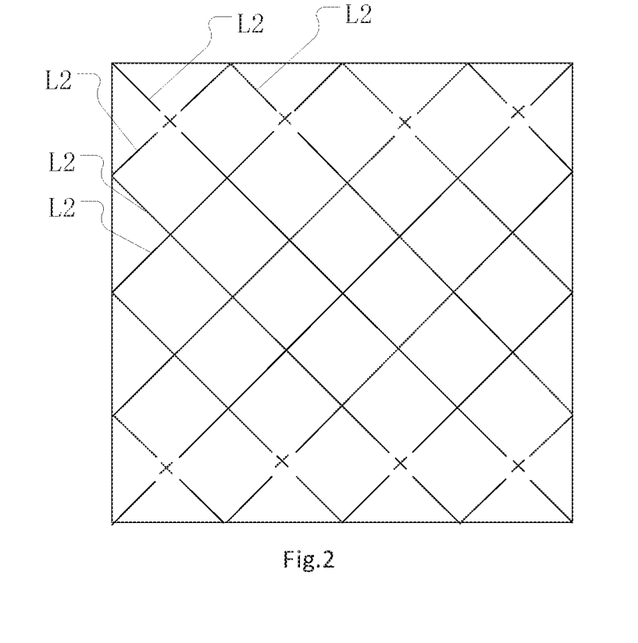
FIG. 2 is a schematic diagram illustrating a structure of a second metal mesh layer in related art.
Figure 3:
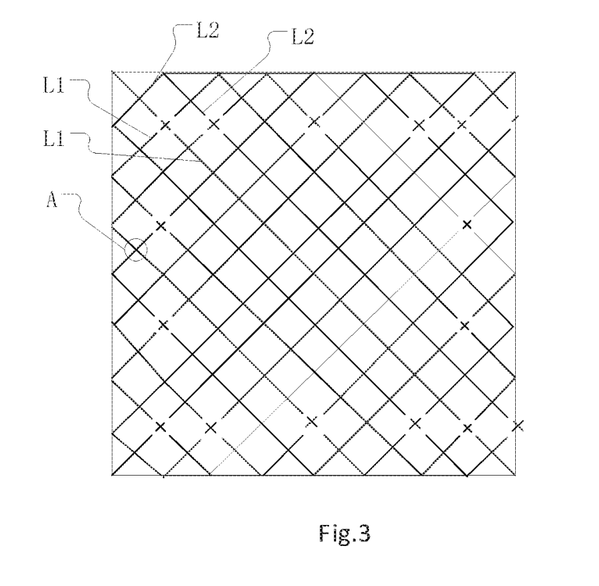
FIG. 3 is a schematic diagram illustrating a structure in which the first metal mesh layer and the second metal mesh layer are opposite to each other in related art.

The described information disclosed with respect to FIGS. 1-3 about the related art is only used to enhance the understanding of the present disclosure, and thus it may include information that does not constitute prior art technology known by those skilled in the art.

In a mutual-capacitive touch screen design in the related art, two layers of metal meshes which are opposite to each other are generally used as the driving functional layer and the sensing functional layer, respectively. As shown in FIGS. 1-3, FIG. 1 is a schematic diagram illustrating a structure of a first metal mesh layer, FIG. 2 is a schematic diagram illustrating a structure of a second metal mesh layer, and FIG. 3 is a schematic diagram illustrating a structure in which the first metal mesh layer and the second metal mesh layer are opposite to each other. Each of the first metal mesh layer and the second metal mesh layer includes a touch channel area and a virtual wiring area. The virtual wiring area and the touch channel area are separated by a virtual wiring opening.

Figure 4:
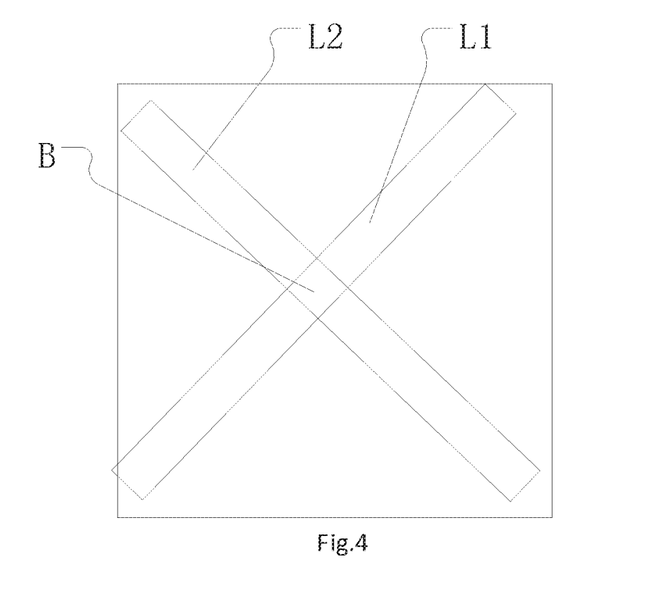
FIG. 4 is an enlarged view for the point A in FIG. 3.

However, as shown in FIG. 3, when the two layers of metal mesh overlap, a large number of virtual wiring openings converge and this results in macroscopically visible ghosting or shadow. FIG. 4 is an enlarged view for the point A in FIG. 3. As shown in FIG. 4, a parallel plate capacitor is formed at a point B where a metal grid line L1 of the virtual wiring area of the first metal mesh layer and a metal grid line L2 of an opposite touch channel area of the second metal mesh layer intersect and this results in parasitic capacitance, thus affecting the touch sensitivity of the touch screen.

The arrangements of the present disclosure provide a touch component, a method for manufacturing the touch component, and a touch screen, which overcome at least one or more problems due to limitations and disadvantages in the art to some extent.

Figure 5:
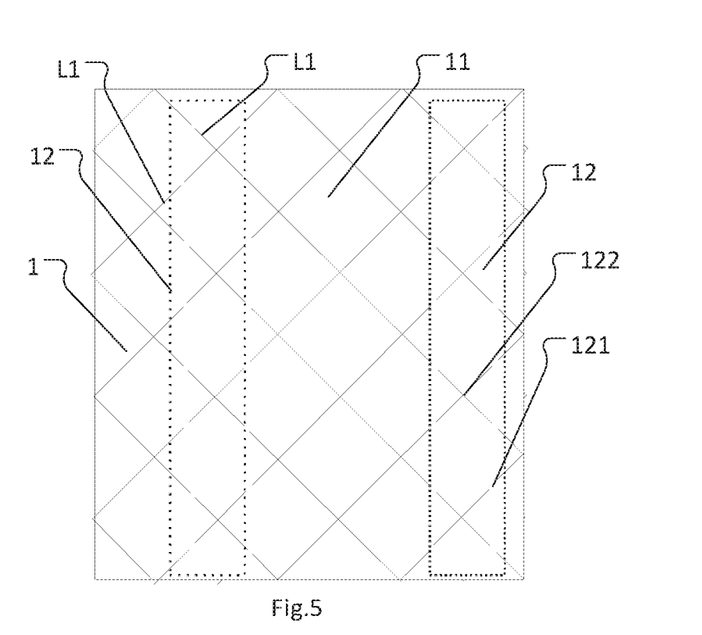
FIG. 5 is a schematic diagram illustrating a structure of a first metal mesh layer of a touch component according to an arrangement of the present disclosure.
Figure 6:
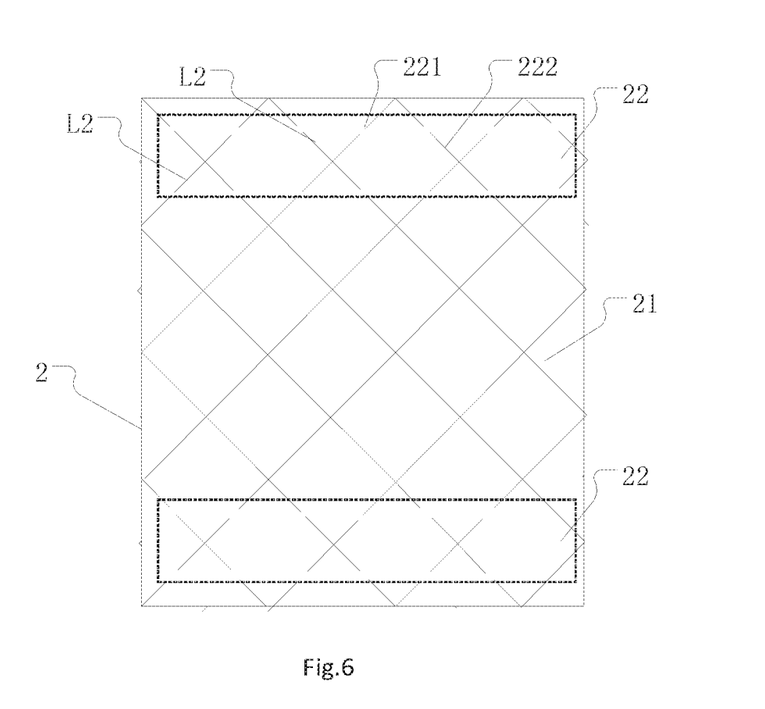
FIG. 6 is a schematic diagram illustrating a structure of a second metal mesh layer of a touch component according to an arrangement of the present disclosure.
Figure 7:
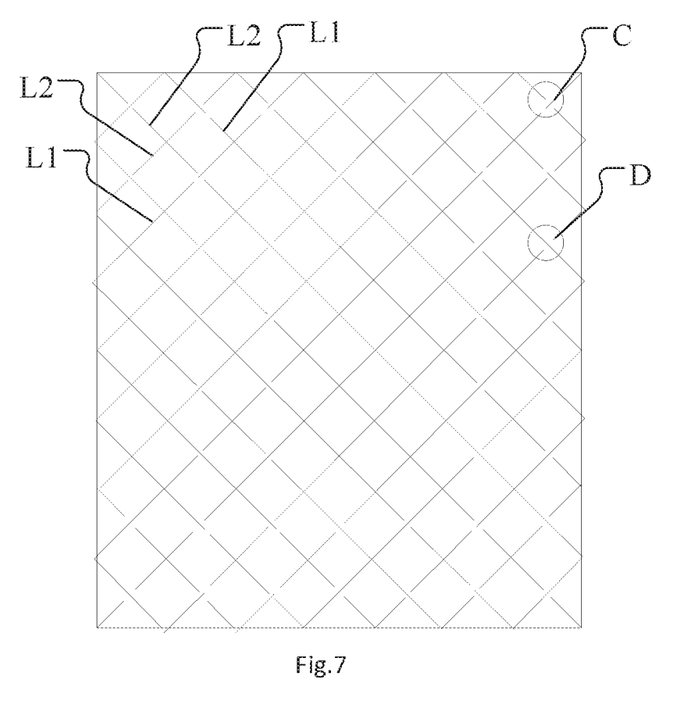
FIG. 7 is a schematic diagram illustrating a structure in which a first metal mesh layer and a second metal mesh layer are opposite to each other according to an arrangement of the present disclosure.
Figure 8:
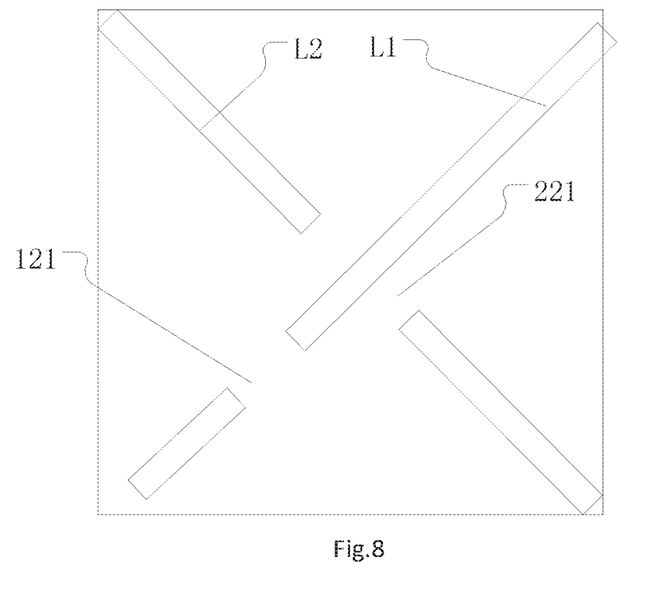
FIG. 8 is an enlarged view for the point C in FIG. 7.
Figure 9:
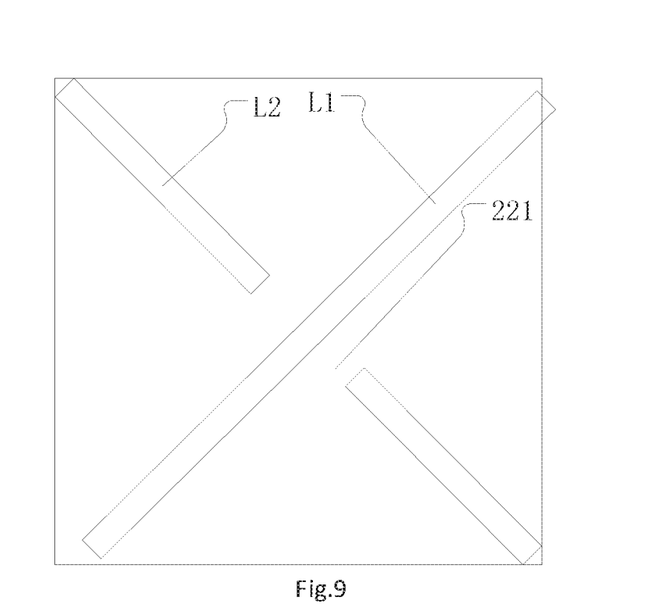
FIG. 9 is an enlarged view for the point D in FIG. 7.

This exemplary arrangement firstly provides a touch component. Referring to FIGS. 5, 6, 7, 8, and 9, FIG. 5 is a schematic diagram illustrating a structure of a first metal mesh layer, FIG. 6 is a schematic diagram illustrating a structure of a second metal mesh layer, FIG. 7 is a schematic diagram illustrating a structure in which a first metal mesh layer and a second metal mesh layer are opposite to each other, FIG. 8 is an enlarged view for the point C in FIG. 7, and FIG. 9 is an enlarged view for the point D in FIG. 7. The touch component includes a first metal mesh layer 1 and a second metal mesh layer 2. The first metal mesh layer 1 includes a plurality of first touch channel areas 11 extending in parallel in a first direction and a plurality of first virtual wiring areas 12 between adjacent ones of the first touch channel areas. The first virtual wiring area 12 includes a plurality of first virtual wiring openings 121 for separating adjacent first touch channel areas 11. The second metal mesh layer 2 is opposite to the first metal mesh layer 1, and includes: a plurality of second touch channel areas 21 extending in parallel in a second direction and a plurality of second virtual wiring areas 22 between adjacent ones of the second touch channel areas 21. The first direction intersects the second direction, and the second virtual wiring area 22 includes a plurality of second virtual wiring openings 221 for separating the adjacent second touch channel areas 21. In this case, a projection of at least part of the first virtual wiring opening on the second metal mesh layer intersects with a grid line of the second metal mesh layer, and a projection of at least part of the second virtual wiring opening on the first metal mesh layer intersects with a grid line of the first metal mesh layer.

The exemplary arrangement provides a touch component including: a first metal mesh layer 1 and a second metal mesh layer 2. A projection of at least part of the first virtual wiring opening on the second metal mesh layer intersects with a grid line of the second metal mesh layer, and a projection of at least part of the second virtual wiring opening on the first metal mesh layer intersects with a grid line of the first metal mesh layer. On the one hand, this design can avoid serious ghosting caused by dense virtual wiring openings. On the other hand, the design reduces the number of intersections between the metal grids of the first virtual wiring area and that of the second touch channel area, and between the metal grids of the second virtual wiring area and that of the first touch channel area, thus effectively reducing the touch capacitance and further improving touch sensitivity.

It should be noted that in the exemplary arrangement, the first metal mesh layer may serve as a sensing functional layer, the second metal mesh layer may serve as a driving functional layer, the first touch channel area may serve as a touch sensing electrode, and the two touch channel areas may serve as a touch driving electrode.

An example arrangement in which the first virtual wiring opening 121 and the second virtual wiring opening 221 can be realized may be an example where the first virtual wiring area includes a plurality of first virtual wirings 122; the first virtual wiring opening 121 is formed between the plurality of the first virtual wirings 122 and the plurality of the first touch channel area 11, and at the same time, when a plurality of columns of the first virtual wirings are included between adjacent first touch channel areas, the first virtual wiring opening 121 is also formed between the first virtual wirings 122; the second virtual wiring area 22 includes a plurality of second virtual wirings 222, the second virtual wiring opening 221 is formed between the plurality of the second virtual wirings 222 and the plurality of the second touch channel area 21, and at the same time, when a plurality of rows of the second virtual wirings are included between adjacent second touch channel areas, the second virtual wiring opening 221 is also formed between the second virtual wirings 222. It should be understood by those skilled in the art that there are still more structuring manner for the first virtual wiring opening 121 and the second virtual wiring opening 221 to be selected, and these variations should be considered as falling within the scope protected by the present disclosure.

In this exemplary arrangement, the first metal mesh layer 1 and the second metal mesh layer 2 may have different mesh shapes. This arrangement will be described by way of an example in which the metal grid of the first metal mesh layer 1 is a rhombic metal grid, the metal grid of the second metal mesh layer 2 is a rhombic or diamond metal grid, and the metal grid of the first metal mesh layer and the metal grid of the second metal mesh layer have the same size. It should be noted that, in other arrangements, the first metal mesh layer 1 and the second metal mesh layer 2 may have other shapes for the grid thereof, and these variations should be considered as falling within the protection scope of the present disclosure.

In the exemplary arrangement, the first virtual wiring 122 may have an X-shaped structure, and the intersection of the first virtual wiring 122 may be aligned with the centroid of the grid of the second metal mesh layer 2; the second virtual wiring 222 may have an X-shaped structure, and the intersection of the second virtual wiring 222 may be aligned with the centroid of the grid of the first metal mesh layer 1.

It should be noted that X-shaped structure should be understood as a structure formed by two intersecting line segments. In the exemplary arrangement, two line segments may intersect at any angle. When the intersection angle of the two line segments is 90°, the diamond metal grid is a square metal grid. The intersection of the first virtual wiring 122 being aligned with the centroid of the grid of the second metal mesh layer 2 should be understood as that, when the first metal mesh layer 1 is opposite to the second metal mesh layer 2, the projection of the intersection of the X-shaped structure on the second metal mesh layer 2 is located on the centroid of the diamond metal grid of the second metal mesh layer 2. The intersection of the second virtual wiring 222 being aligned with the centroid of the grid of the first metal mesh layer 1 should be understood as that, when the first metal mesh layer 1 is opposite to the second metal mesh layer 2, the projection of the intersection of the X-shaped structure on the first metal mesh layer 1 is located on the centroid of the diamond metal grid of the first metal mesh layer 1.

It should be noted that, in other arrangements, the intersection of the first virtual wiring 122 may not be aligned with the centroid of the grid of the second metal mesh layer 2; and correspondingly, the intersection of the second virtual wiring 222 may not be aligned with the centroid of the grid of the first metal mesh layer 1.

In the exemplary arrangement, the metal grid is a conductor with a smaller sheet resistance and may be composed of one or more of copper, aluminum, and silver. It should be noted that the metal grid can also be composed of other conductive metals.

In the exemplary arrangement, when the first virtual wiring opening 121 is opposite to the second virtual wiring opening 221, the projection of the first virtual wiring opening on the second metal mesh layer is located on the grid of the second metal mesh layer, or the projection of the second virtual wiring opening on the first metal mesh layer is located on the grid of the first metal mesh layer. When the first virtual wiring opening 121 is not opposite to the second virtual wiring opening 221, the projection of the second virtual wiring opening on the first metal mesh layer intersects with the grid line of the first metal mesh layer, or the projection of the first virtual wiring opening on the second metal mesh layer intersects with the grid line of the second metal mesh layer. It should be noted that, the first virtual wiring opening 121 being opposite to the second virtual wiring opening 221 should be understood as that, when the first metal mesh layer is disposed opposite to the second metal mesh layer, the projection of the first virtual wiring opening 121 on the second metal mesh layer is located close to the second virtual opening. As shown in FIG. 8, the first virtual wiring opening 121 is opposite to the second virtual wiring opening 221, and the projection of the first virtual wiring opening on the second metal mesh layer is located on the grid line of the second metal mesh layer. Here, the projection of the second virtual opening on the first metal mesh layer may also be provided to be located on the grid of the first metal mesh by adjusting the shape of the first virtual wiring 122 or the second virtual wiring 222. As shown in FIG. 9, the first virtual wiring opening 121 is not opposite to the second virtual wiring opening 221, and the projection of the second virtual wiring opening on the first metal mesh layer intersects with the grid line of the first metal mesh layer. On other positions, there also exists the arrangement in which the projection of the first virtual wiring opening on the second metal mesh layer intersects with the grid line of the second metal mesh layer.

Figure 10:
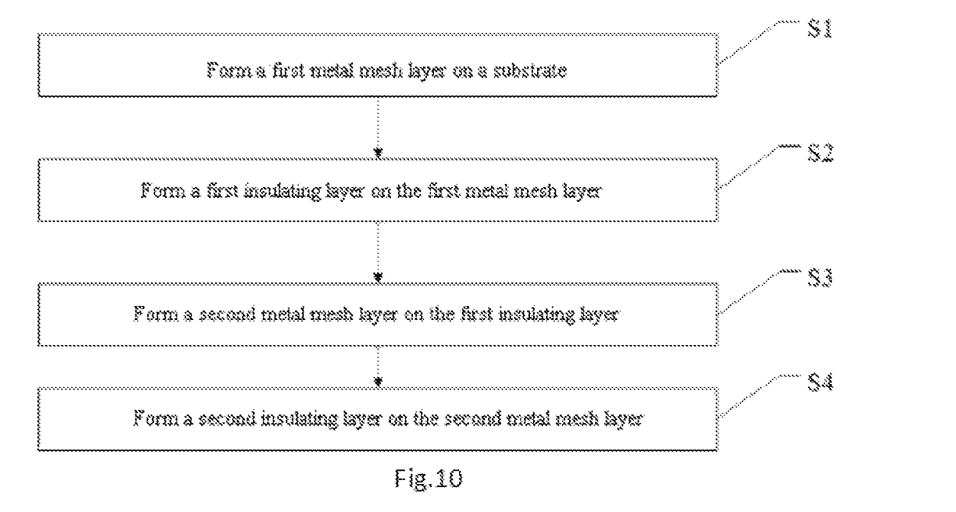
FIG. 10 is a flow chart illustrating a method for manufacturing a touch component according to an arrangement of the present disclosure.

The exemplary arrangement further provides a method for manufacturing a touch component. As shown in FIG. 10, it is a flow chart illustrating the method for manufacturing the touch component, including the following.

In S1: a first metal mesh layer is formed on a substrate, the first metal mesh layer includes a plurality of first touch channel areas extending in parallel in a first direction and a plurality of first virtual wiring areas between adjacent ones of the first touch channel areas, and the first virtual wiring area includes a plurality of first virtual wiring openings for separating adjacent first touch channel areas;

In S2: a first insulating layer is formed on the first metal mesh layer;

In S3: a second metal mesh layer is formed on the first insulating layer, the second metal mesh layer is opposite to the first metal mesh layer and includes a plurality of second touch channel areas extending in parallel in a second direction and a plurality of second virtual wiring areas between adjacent ones of the second touch channel areas, the first direction intersects the second direction, and the second virtual wiring area includes a plurality of second virtual wiring openings for separating the adjacent second touch channel areas, in this case, a projection of at least part of the first virtual wiring opening on the second metal mesh layer intersects with a grid line of the second metal mesh layer, and a projection of at least part of the second virtual wiring opening on the first metal mesh layer intersects with a grid line of the first metal mesh layer.

In S4: a second insulating layer is formed on the second metal mesh layer.

It should be noted that the first metal mesh layer may serve as a sensing functional layer, and the second metal mesh layer may serve as a driving functional layer; the first touch channel area may serve as a touch sensing electrode, and the second touch channel area may serve as a touch driving electrode.

Figure 11:
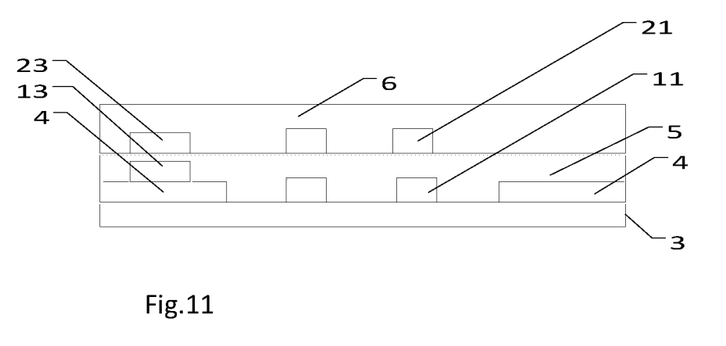
FIG. 11 is a side view illustrating a metal mesh touch screen according to an arrangement of the present disclosure.

In practical applications, the first touch channel area and the second touch channel area need to be connected to the circuit board through the wiring. However, the wiring would affect the display effect of the touch screen. As shown in FIG. 11, it is a side view illustrating the touch component. In S1: before the first metal mesh layer is formed on the substrate 3, a black matrix 4 may be formed on the substrate, a first metal mesh layer 1 including the first touch channel area 11 is formed within the black matrix 4, and a first wiring 13 is formed on the edge of the black matrix 4.

In S2, a first insulating layer 5 is formed on the first metal mesh layer 1 and the first wiring 13.

In S3, a second metal mesh layer 2 including the second touch channel area 21 and a second wiring 23 are formed on the first insulating layer 5, the projection of the second wiring 23 in the vertical direction is located on the black matrix 4, and the projection of the second metal mesh layer 2 in the vertical direction is within the black matrix 4.

In S4, a second insulating layer 6 is formed on the second metal mesh layer and the second wiring 23.

With the black matrix, the wiring can be avoided to be displayed on the display screen and thus the display effect can be improved.

The exemplary arrangement also provides a touch screen including the touch component as described above. The structure and function principle of the touch component has been described in detail in the above content, and will not be repeated here.

As can be seen from the above technical solutions, the touch component, the method for manufacturing the touch component and the touch screen provided by the arrangements of the present disclosure can have the following advantages and positive effects.

In exemplary arrangements of the present disclosure, a touch component, a manufacturing method, and a touch screen are provided. The touch component includes a first metal mesh layer and a second metal mesh layer. A projection of at least part of the first virtual wiring opening on the second metal mesh layer intersects with a grid line of the second metal mesh layer, and a projection of at least part of the second virtual wiring opening on the first metal mesh layer intersects with a grid line of the first metal mesh layer. On the one hand, this design can avoid serious ghosting caused by dense virtual wiring openings. On the other hand, the design reduces the number of intersections between the metal grids of the first virtual wiring area and that of the second touch channel area, and between the metal grids of the second virtual wiring area and that of the first touch channel area, thus effectively reducing the touch capacitance and further improving touch sensitivity.

Those skilled in the art will readily recognize other arrangements of the present disclosure upon consideration of the specification and practice. The present disclosure is intended to cover any variations, uses, or adaptations of the present disclosure that follow the general principles of the present disclosure and include the common knowledge or customary means in the art. The specification and examples are exemplary only, and the true scope and spirit of the present disclosure are indicated by the appended claims.

The features, structures, or characteristics described above may be combined in any suitable manner in one or more arrangements and, if possible, the features discussed in the various arrangements are interchangeable. In the above description, numerous specific details are provided to facilitate to fully understand the arrangements of the present disclosure. However, it is appreciated for those skilled in the art that the technical solutions of the present disclosure may be practiced without one or more of the specific details, or that other methods, components, materials or the like may be employed. In other instances, well-known structures, materials, or operations are not shown or described in detail to prevent from obscuring aspects of the present disclosure.

What is claimed is:

1. A touch component, comprising:
   a first metal mesh layer comprising a plurality of first touch channel areas extending in parallel in a first direction and a plurality of first virtual wiring areas between adjacent first touch channel areas of the first touch channel areas, wherein the plurality of first virtual wiring areas comprises a plurality of first virtual wiring openings for separating the adjacent first touch channel areas;
   a second metal mesh layer opposite to the first metal mesh layer, comprising a plurality of second touch channel areas extending in parallel in a second direction and a plurality of second virtual wiring areas between adjacent second touch channel areas of the second touch channel areas, wherein the first direction intersects the second direction, and the plurality of second virtual wiring areas comprises a plurality of second virtual wiring openings for separating the adjacent second touch channel areas,
   wherein each of the plurality of first virtual wiring opening is formed to cut off a first grid line of the first metal mesh layer, and extends in a direction along which the first grid line, which is cut off, extends,
   wherein each of the plurality of second virtual wiring opening is formed to cut off a second grid line of the second metal mesh later, and extends in a direction along which the second grid line, which is cut off, extends, wherein the plurality of first virtual wiring openings and the plurality of second virtual wiring openings are configured to have at least one of an arrangement in which:

a projection of at least part of the plurality of first virtual wiring openings on the second metal mesh layer intersects with the second grid line of the second metal mesh layer, and the projection of the first virtual wiring opening on the second metal mesh later and the second grid line of the second metal mesh later, which are intersected, extend in different directions, and a projection of at least part of the plurality of second virtual wiring openings on the first metal mesh layer intersects with the first grid line of the first metal mesh layer, and the projection of the second virtual wiring opening on the first metal mesh layer and the first grid line of the first metal mesh layer intersected and extend in different directions.

2. The touch component according to claim 1, wherein the plurality of first virtual wiring areas comprises a plurality of first virtual wirings; and the plurality of first virtual wiring openings is formed between the plurality of the first virtual wirings and the plurality of the first touch channel areas, and between the first virtual wirings.

3. The touch component according to claim 2, wherein the plurality of first virtual wirings has an X-shaped structure.

4. The touch component according to claim 3, wherein an intersection of the X-shaped structure of the plurality of first virtual wirings is aligned with a centroid of a grid of the second metal mesh layer.

5. The touch component according to claim 1, wherein the plurality of second virtual wiring areas comprises a plurality of second virtual wirings; and the plurality of second virtual wiring openings is formed between the plurality of the second virtual wirings and the plurality of the second touch channel areas, and between the second virtual wirings.

6. The touch component according to claim 5, wherein the plurality of second virtual wirings has an X-shaped structure.

7. The touch component according to claim 6, wherein an intersection of the X-shaped structure of the plurality of second virtual wirings is aligned with a centroid of a grid of the first metal mesh layer.

8. The touch component according to claim 1, wherein a projection of at least part of the plurality of first virtual wiring openings on the second metal mesh layer is within a grid of the second metal mesh layer.

9. The touch component according to claim 8, wherein a projection of at least part of the plurality of second virtual wiring openings on the first metal mesh layer is within a grid of the first metal mesh layer.

10. The touch component according to claim 1, wherein a projection of at least part of the plurality of second virtual wiring openings on the first metal mesh layer is within a grid of the first metal mesh layer.

11. The touch component according to claim 1, wherein a grid of the first metal mesh layer is a diamond metal grid.

12. The touch component according to claim 1, wherein a grid of the second metal mesh layer is a diamond metal grid.

13. The touch component according to claim 1, wherein a grid of the first metal mesh layer and the metal grid of the second metal mesh layer have the same size.

14. The touch component according to claim 1, wherein a metal grid is formed of one or more of copper, aluminum and silver.

15. A method for manufacturing a touch component, comprising:

forming a first metal mesh layer on a substrate, wherein the first metal mesh layer comprises a plurality of first touch channel areas extending in parallel in a first direction and a plurality of first virtual wiring areas between adjacent first touch channel areas of the first touch channel areas, and the plurality of first virtual wiring areas comprises a plurality of first virtual wiring openings for separating the adjacent first touch channel areas;

forming a first insulating layer on the first metal mesh layer;

forming a second metal mesh layer on the first insulating layer, wherein the second metal mesh layer is opposite to the first metal mesh layer and comprises a plurality of second touch channel areas extending in parallel in a second direction and a plurality of second virtual wiring areas between adjacent second touch channel areas of the second touch channel areas, the first direction intersects the second direction, and the plurality of second virtual wiring areas comprises a plurality of second virtual wiring openings for separating the adjacent second touch channel areas; and forming a second insulating layer on the second metal mesh layer, wherein each of the plurality of first virtual wiring opening is formed to cut off a first grid line of the first metal mesh layer, and extends in a direction along which the first grid line, which is cut off, extends, wherein each of the plurality of second virtual wiring opening is formed to cut off a second grid line of the second metal mesh layer, and extends in a direction along which the second grid line, which is cut off, extends, wherein the plurality of first virtual wiring openings and the plurality of second virtual wiring openings are configured to be at least one of an arrangement in which:

a projection of at least part of the plurality of first virtual wiring opening on the second metal mesh layer intersects with the second grid line of the second metal mesh layer, and the projection of the first virtual wiring opening on the second metal mesh layer and the second grid line of the second metal mesh layer, which are intersected, extend in different directions, and a projection of at least part of the plurality of second virtual wiring opening on the first metal mesh layer intersects with the first grid line of the first metal mesh layer and the projection of the second virtual wiring opening on the first metal mesh layer and the first grid line of the first metal mesh layer intersect and extend in different directions.

16. A touch screen, comprising:

a touch component, wherein the touch component comprises:

a first metal mesh layer comprising a plurality of first touch channel areas extending in parallel in a first direction and a plurality of first virtual wiring areas between adjacent ones of the first touch channel areas, wherein the first virtual wiring area comprises a plurality of first virtual wiring openings for separating adjacent first touch channel areas;

a second metal mesh layer opposite to the first metal mesh layer, comprising a plurality of second touch channel areas extending in parallel in a second direction and a plurality of second virtual wiring areas between adjacent ones of the second touch channel areas, wherein the first direction intersects the second direction, and the second virtual wiring area comprises a plurality of second virtual wiring openings for separating the adjacent second touch channel areas, wherein each of the plurality of first virtual wiring opening is formed to cut off a first grid line of the first metal mesh layer, and extends in a direction along which the first grid line, which is cut off, extends, wherein each of the plurality of second virtual wiring opening is formed to cut off a second grid line of the second metal mesh layer, and extends in a direction along which the second grid line, which is cut off, extends, wherein the first virtual wiring opening and the second virtual wiring opening are configured to have at least one of an arrangement in which:

a projection of at least part of the first virtual wiring opening on the second metal mesh layer intersects with the second grid line of the second metal mesh layer, and the projection of the first virtual wiring opening on the second metal mesh layer and the second grid line of the second metal mesh layer, which are intersected, extend in different directions, and a projection of at least part of the second virtual wiring opening on the first metal mesh layer intersects with the first grid line of the first metal mesh layer and the projection of the second virtual wiring opening on the first metal mesh layer and the first said line of the first metal mesh layer intersect and extend in different directions.

* * * * *